United States Patent
Dietze et al.

(10) Patent No.: US 9,591,488 B2
(45) Date of Patent: Mar. 7, 2017

(54) CONTENTS MANAGEMENT FOR MOBILE STATION HAVING RUNTIME ENVIRONMENT

(71) Applicant: GIESECKE & DEVRIENT GMBH, Munich (DE)

(72) Inventors: Claus Dietze, Obersochering (DE); Gero Galka, Valley (DE)

(73) Assignee: Giesecke & Devrient GMBH, Munich (DE)

( * ) Notice: Subject to any disclaimer, the term of this patent is extended or adjusted under 35 U.S.C. 154(b) by 0 days.

(21) Appl. No.: 14/427,160

(22) PCT Filed: Sep. 10, 2013

(86) PCT No.: PCT/EP2013/002720
§ 371 (c)(1),
(2) Date: Mar. 10, 2015

(87) PCT Pub. No.: WO2014/040724
PCT Pub. Date: Mar. 20, 2014

(65) Prior Publication Data
US 2015/0245213 A1  Aug. 27, 2015

(30) Foreign Application Priority Data

Sep. 11, 2012 (DE) .......... 10 2012 017 915

(51) Int. Cl.
*H04M 1/66* (2006.01)
*H04W 12/08* (2009.01)
(Continued)

(52) U.S. Cl.
CPC ............ *H04W 12/08* (2013.01); *G06F 21/53* (2013.01); *G06F 21/74* (2013.01);
(Continued)

(58) Field of Classification Search
USPC ............................................. 455/410; 705/39
See application file for complete search history.

(56) References Cited

U.S. PATENT DOCUMENTS

2012/0159148 A1   6/2012  Behren et al.

FOREIGN PATENT DOCUMENTS

DE  102009040419 A1  4/2011
EP       1510012 A1  3/2005
(Continued)

OTHER PUBLICATIONS

"GlobalPlatform Device Technology: TEE System Architecture," GlobalPlatform Inc. Public Release Version 1.0, Dec. 2011, pp. 1-24, Document Reference: GPD_SPE_009.
(Continued)

*Primary Examiner* — David Q Nguyen
(74) *Attorney, Agent, or Firm* — Workman Nydegger

(57) ABSTRACT

The invention creates a mobile station comprising a mobile end device (ME) with a secured runtime environment (TEE) and a removable or firmly implemented security element (SE), with an end device send server (TEE-TSM) arranged in the security element (SE), which is arranged to send to the secured runtime environment (TEE) end device messages which can be received by the secured runtime environment (TEE). The end device messages are sent by a trusted service manager (SE-TSM), which is provided for the security element (SE), to the security element (SE), thereby higher efficiency being guaranteed at maintained security.

9 Claims, 2 Drawing Sheets

(51) Int. Cl.
  *G06F 21/53*  (2013.01)
  *G06F 21/74*  (2013.01)
  *H04L 29/06*  (2006.01)
  *H04W 12/04*  (2009.01)

(52) U.S. Cl.
  CPC ........ *H04L 63/0853* (2013.01); *H04L 63/168* (2013.01); *H04W 12/04* (2013.01)

(56) References Cited

FOREIGN PATENT DOCUMENTS

| EP | 1890228 A2 | 2/2008 | |
|----|------------|--------|---|
| EP | 2291015 A1 | 3/2011 | |
| GB | WO 2009027743 A2 * | 3/2009 | ............. G06F 21/34 |
| WO | 2009027743 A2 | 3/2009 | |

OTHER PUBLICATIONS

German Examination Report for corresponding German Application No. 102012017915.4, Jul. 11, 2013.

International Search Report for corresponding International PCT Application No. PCT/EP2013/002720, Nov. 28, 2013.

"The Trusted Execution Environment: Delivering Enhanced Security at a Lower Cost to the Mobile Market, White Paper," GlobalPlatform Inc., Feb. 28, 2011, pp. 1-26, URL: http://www.globalplatform.org/documents/GlobalPlatform_TEE_White_Paper_Feb2011.pdf.

* cited by examiner

CONTENTS MANAGEMENT FOR MOBILE STATION HAVING RUNTIME ENVIRONMENT

BACKGROUND

The invention relates to a mobile station comprising a mobile end device having a secured runtime environment and a removable or firmly implemented security element, to a management server, and to a contents management system for the secured execution environment.

Mobile stations in the GSM and UMTS system and similar mobile radio systems comprise a mobile end device, e.g. mobile phone or smart phone, and a removable or firmly implemented security element. In the security element there are implemented connection data, e.g. IMSI (International Mobile Subscriber Identity), keys and algorithms for operating a connection in the mobile radio network. In the GSM or UMTS system there is known the SIM card or USIM card (SIM=Subscriber Identity Module, USIM=Universal SIM) as a removable security element. As a firmly implemented security element there is known eUICC (embedded Universal Integrated Circuit Card) which is a firmly soldered component. The communication with the security element is standardised by standards of the organisation ETSI (European Telecommunications Standards Institute).

In mobile end devices there are known secured runtime environments TEEs (TEE=Trusted Execution Environment) in which a separation between execution environments of different security grades is generated on the software level. Security-critical data and programs are stored under the management of the secured runtime environment. The remaining data and programs are stored in a normal runtime environment existing besides the secured one. The insecure runtime environment also referred to as "normal zone" or "normal world" is controlled by a normal operating system (e.g. Android, Windows Phone, Symbian). The secured or trustworthy runtime environment also referred to as "trust zone" or "trusted world" or "secure world" or "trusted execution environment TEE" is controlled by a security operating system.

In particular security-critical applications and some peripheral functions (e.g. keyboard driver) are controlled in a secure manner by the security operating system. Applications under the security operating system are also referred to as trusted applications (e.g. Global Platform) or in some cases as Trustlets (registered trademark), associatively following the concepts "trust" and "applet".

For example the document "Global Platform Device Technology: TEE System Architecture, Version 0.4, Public Review Draft October 2011, Document Reference: GPD_SPE_009" describes a mobile end device having a normal or insecure execution environment "Rich Execution Environment (REE)" and a secure execution environment "Trusted Execution Environment (TEE)" (cf. chapter 1).

For the management of the contents (e.g. data, programs) in the security element the mobile radio network providers have a mature server infrastructure. This allows them to load messages, in which the contents are included, according to ETSI standard from a contents server via the mobile radio network (OTA, over the air) into the security element in a cryptographically secured manner.

For the management of the contents in the secured runtime environment of a mobile end device likewise a cryptographically securable infrastructure is necessary. Conventionally, the contents of secured runtime environments, e.g. such as according to Global Platform, are managed by a so-called trusted service manager.

Due to the higher security requirements of the secured runtime environment in comparison to the normal runtime environment, the infrastructure is not sufficient for the management of the contents of a conventional mobile end device. The server infrastructure for the contents management of the security element is not suitable directly for the contents management of the secured runtime environment. Because the communication between the security element and a server is effected by means of messages according to ETSI standard. Messages to the secured runtime environment must meet other stipulations, e.g., those of the Global Platform organisation. A trusted service manager is able to transmit such messages that are conform to Global Platform to the secured runtime environment in a secure manner. The operation of an additional secure server infrastructure for the management of the contents of the secured runtime environment means a great organizational and financial expenditure for the mobile radio network provider.

The invention is based on the object to provide a mobile station having a secured runtime environment, which makes possible an efficient and at the same time secure management of the contents (data, programs) of the secured runtime environment. Moreover, a matching management server for mobile stations is to be stated.

SUMMARY

From EP 1 510 012 B1 there is known a mobile station with a removable security element in the form of a SIM card. In the SIM card there are additionally stored, besides the conventional connection data (IMSI) for operating a connection in the mobile radio network, also connection data (IP address) for operating a connection in an IP network. In the SIM card there is also implemented a server which redirects a connection established via the mobile radio network to an IP connection.

The mobile station according to the invention comprises an end device (e.g. smart phone, mobile phone or the like) having a secured runtime environment as well as a removable or firmly implemented security element (e.g. SIM card, UICC, eUICC etc). In the security element there is arranged a security element receiving unit for receiving security element messages sent to the security element. Security element messages are provided to introduce contents into the security element, for example data, programs or updates for data or programs already present in the security element, here in particular also data and programs concerning the subscription, i.e. the contractual relationship, in order to operate mobile radio connections via a mobile network of a mobile network provider with the mobile station. In the secured runtime environment there is arranged an end device receiving unit for receiving end device messages sent to the secured runtime environment of the end device. End device messages are provided to load contents such as data, programs and updates for data and programs into the secured runtime environment. As programs there are provided, for example, applications such as payment applications.

The mobile station is characterized by an end device send server arranged in the security element, which is arranged to send end device messages to the secured runtime environment, which can be received by the secured runtime environment.

In this way, contents for the secured runtime environment can be sent to the security element. The end device send server arranged in the security element forwards the contents to the secured runtime environment. Consequently, a network provider can use the server infrastructure arranged for the management of the security element in order to also manage the secured runtime environment. In particular, for the management of the contents of the secured runtime environment a management server can be used which, actually, is provided for the management of the contents of the security element and which must be enhanced only slightly for this purpose. Such a management server is stated in claim 3. The necessary passing on of the communication to the secured runtime environment is not carried out by an external server of the network provider, but by the server implemented internally within the card (or in the eUICC etc) in the security element. This relieves the network provider. As the communication between the external server (e.g. operated at the network provider) and the security element as well as the communication between the security element and the secured runtime environment are secure, the solution according to the invention is moreover without security losses compared with a solution having a separate external server infrastructure for the secured runtime environment.

Therefore, according to claim 1 there is created a mobile station having a secured runtime environment, which makes possible an efficient and at the same time secure management of the contents of the secured runtime environment.

As an end device send server there is provided, for example, a so-called trusted service manager. According to the invention, the trusted service manager for the secured runtime environment is implemented in the security element (e.g. SIM card, UICC, eUICC, etc).

Selectively, the security element and the security element messages are specified according to ETSI and the secured runtime environment and the end device messages are specified according to Global Platform.

A management server according to the invention is arranged for the management of the contents of mobile stations. The mobile station comprises in each case a mobile end device having a secured runtime environment and a removable or firmly implemented security element. The management server comprises a conventional security element send server which is arranged to send security element messages to the security element, which can be received and evaluated by the security element. The management server is characterized by the fact that it is further arranged to accept end device messages, which can be received by the secured runtime environment of the end device, and to pass these on to an end device send server arranged in the security element. The communication with the secured runtime environment is carried out, finally, by the end device send server provided in the security element and stated in claim 1. The management server itself needs not to be able to communicate directly with the secured runtime environment. Consequently, the provider of the management server, e.g. a mobile radio network provider, has a comparatively low expenditure.

A contents management system according to the invention comprises at least one mobile station as well as a management server as described above.

The contents management system selectively further comprises a contents server, by which contents, in particular data or/and programs, for storage into the secured runtime environment of a mobile end device can be supplied to the security element send server. The contents server for contents for the secured runtime environment can selectively be provided separated from a contents server for contents for the security element. Alternatively, a common/combined contents server can be provided for contents for security element and runtime environment. The contents server can be operated by the same provider as the management server or alternatively by another provider.

A method according to the invention for storing a content, in particular data or/and a program, into the secured runtime environment of the mobile end device is characterized in that the content from a contents server provided outside the mobile station is supplied to a security element send server provided outside the mobile station, the content is sent in a security element message from the security element send server to an end device send server arranged in the security element and the content is sent in an end device message from the end device send server to the secured runtime environment.

As contents there can be provided in particular data or/and program code such as drivers, applications or/and updates therefor.

BRIEF DESCRIPTION OF THE DRAWINGS

Hereinafter the invention will be explained more closely on the basis of exemplary embodiments and with reference to the drawing, in which there are shown.

DETAILED DESCRIPTION OF VARIOUS EMBODIMENTS

Figure 1:
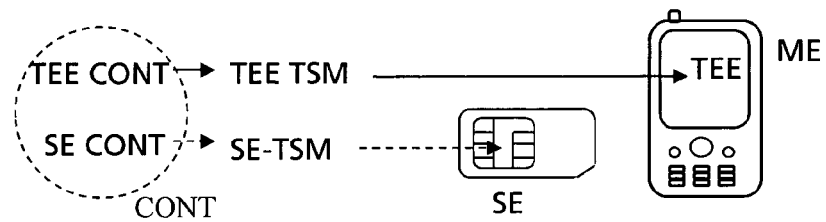
FIG. 1 a conventional loading of contents into a mobile station.
Figure 2:
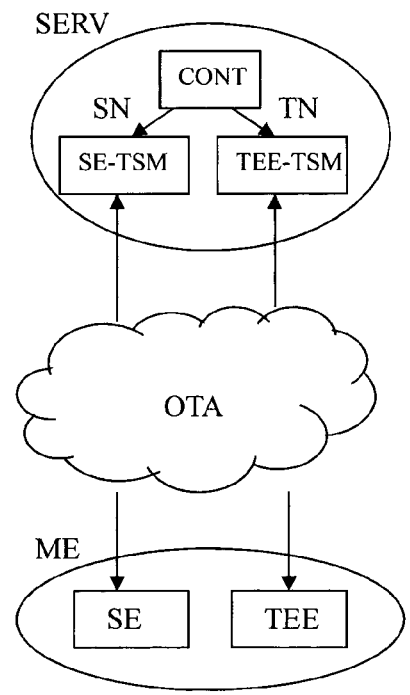
FIG. 2 a conventional loading of contents into a mobile station.

FIG. 1 and FIG. 2 show the conventional loading of contents into a mobile station which comprises a mobile end device ME with a secured runtime environment TEE and a security element SE. Contents (data, program code, drivers, applications, updates for the mentioned contents etc.) CONT for the secured runtime environment TEE are supplied according to Global Platform by a TEE contents server TEE CONT to a trusted service manager TEE TSM and are loaded by the TEE TSM into the secured runtime environment TEE of the end device ME. Contents (data, program code, drivers, applications, updates for the mentioned contents etc.) CONT for the security element SE are supplied according to ETSI by an SE contents server SE CONT to a security element trusted service manager SE TSM (security element send server) and are loaded into the security element by the SE TSM. As shown in FIG. 2, the contents for the security element SE are transmitted in security element messages SN conforming to ETSI. Contents for the secured runtime environment TEE are transmitted in end device messages TN conforming to Global Platform. The conventional security element trusted service Manger SE TSM can process only messages conforming to ETSI. The conventional trusted service manager for the secured runtime environment TEE TSM can only process messages according to Global Platform.

According to FIG. 1 and FIG. 2, thus, contents for end device ME and security element SE are conventionally supplied and loaded by separate server infrastructures.

Figure 3:
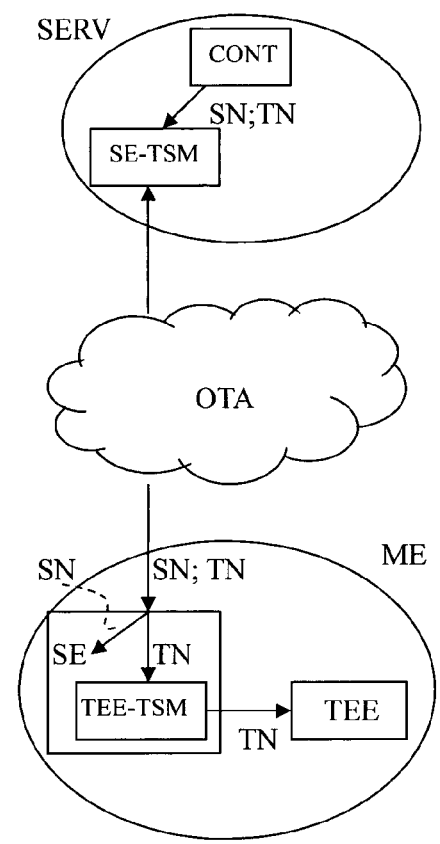
FIG. 3 a storing of contents into a mobile station, according to an embodiment of the invention.

FIG. 3 shows a loading of contents into a mobile station, according to an embodiment of the invention. Contents for the security element SE are loaded as in FIG. 1, 2 in a conventional manner into the security element SE. Contents for the secured runtime environment TEE are sent, in this regard in the conventional manner, in end device messages TN conforming to Global Platform. In contrast to the prior art, these end device messages TN are sent by the trusted service manager SE TSM, which is provided for the security element SE, (security element send server) to the security element SE. The TEE trusted service manager TEE TSM implemented in the security element SE, which is provided for the secured runtime environment TEE, (end device send server) recognizes the end device message TN as such and passes it on to the secured runtime environment TEE of the end device ME. Hence, with the system as outlined in FIG. 3 the management of the secured runtime environment TEE is shifted from a conventional external TEE TSM server to the enhanced security element SE. In the security element SE the management of the TEE is carried out, more precisely, by the TEE TSM server integrated internally within the card.

The invention claimed is:

1. A mobile station comprising a mobile end device and a security element, the mobile end device having a secured runtime environment, and the security element being removably or firmly implemented,
   wherein the security element includes a security element receiving unit configured to receive security element messages sent to the security element,
   wherein an end device receiving unit is arranged in the secured runtime environment of the end device, the end device receiving unit being configured to receive end device messages sent to the secured runtime environment of the end device from a mobile network provider system,
   wherein the security element receiving unit is further configured to receive secured end device messages, and
   wherein the security element further includes an end device send server arranged to send secured end device messages to the secured runtime environment, the secured end device messages being receivable by the secured runtime environment as said end device messages.

2. The mobile station of claim 1, wherein the security element and the security element messages are specified according to ETSI and the secured runtime environment and the end device messages are specified according to Global Platform.

3. A contents management system comprising at least one mobile station according to claim 1.

4. The contents management system of claim 3, further comprising a contents server by which contents including data or/and programs for storage in the secured runtime environment of a mobile end device can be supplied to the security element send server.

5. A management server for mobile stations, the respective mobile station comprising a mobile end device having and a security element, the mobile end device having a secured runtime environment, and the security element being removably or firmly implemented,
   wherein the management server comprises a security element send server and, wherein the security element send server is arranged to send security element messages to the security element, wherein the security element messages can be received by the security element,
   wherein
   the management server is arranged to accept end device messages which can be received by the secured runtime environment of the end device and to pass the end device messages on to an end device send server arranged in the security element of the mobile end device, wherein the security element messages are receivable by the secured runtime environment as said end device messages.

6. A contents management system comprising at least one management server according to claim 5.

7. The contents management system of claim 6, further comprising a contents server by which contents including data or/and programs for storage in the secured runtime environment of a mobile end device can be supplied to the security element send server.

8. A method, for a mobile station comprising a mobile end device and a security element, the mobile end device having a secured runtime environment, and the security element being removably or firmly implemented, for storing a content including data or a program in the secured runtime environment of the mobile end device, the mobile end device having an end device receiving unit arranged in the secured runtime environment of the mobile end device, the end device receiving unit being configured to receive end device messages sent to the secured runtime environment of the end device from a mobile network provider system, the method comprising the steps of:
   supplying the content from a contents server to a security element send server, wherein the contents server is provided outside the mobile station and the security element send server is provided outside the mobile station;
   sending the content in a security element message from the security element send server to an end device send server arranged in the security element of the mobile end device; and
   sending the content in an end device message from the end device send server to the secured runtime environment.

9. The method of claim 8, wherein the security element and the security element messages are specified according to ETSI and the secured runtime environment and the end device messages are specified according to Global Platform.

* * * * *